Jan. 4, 1927.　　　　W. PÜLZ　　　　1,613,192
WEIGHING MACHINE
Filed Feb. 16, 1925
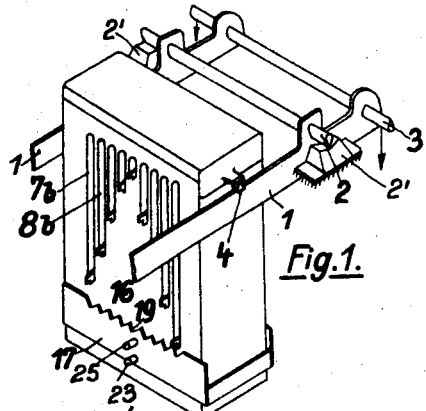
Fig.1.
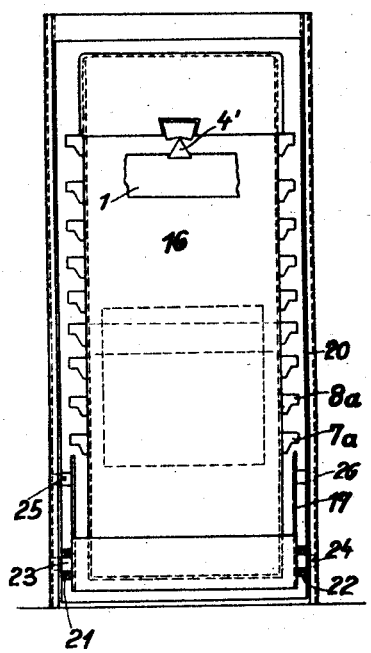
Fig.2.
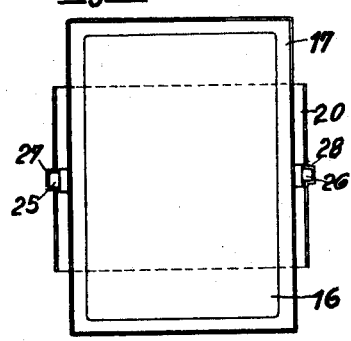
Fig.4.
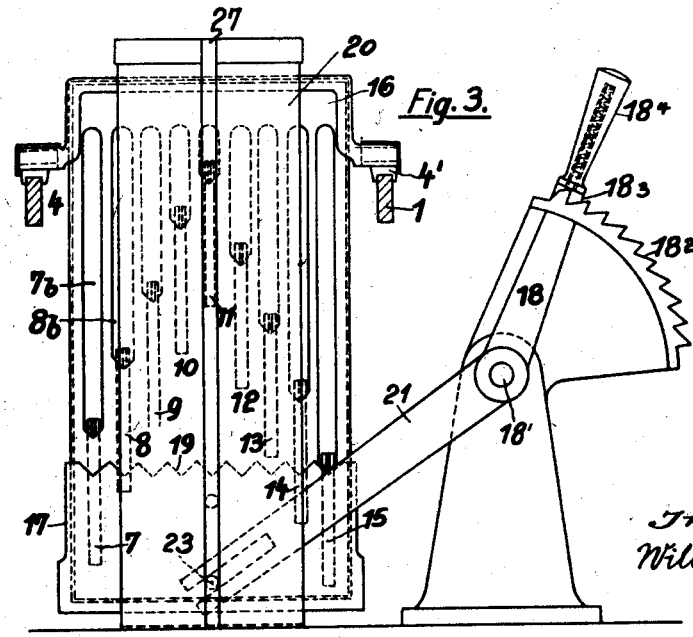
Fig.3.
Inventor:
Willy Pülz.
by 
Atty.

Patented Jan. 4, 1927.

1,613,192

UNITED STATES PATENT OFFICE.

WILLY PÜLZ, OF BERLIN-NIEDERSCHONHAUSEN, GERMANY.

WEIGHING MACHINE.

Application filed February 16, 1925, Serial No. 9,607, and in Germany February 21, 1924.

My invention relates to weighing machines and more especially to machines of the counterbalance type in which the load is balanced by the addition or subtraction of weights.

It is an object of my invention to provide a weighing machine of this kind which is simpler and more effective in use than similar machines hitherto designed. To this end I provide casings suspended from the balance beam or beams of the weighing machine, each casing containing a set of weights normally suspended side by side from seats provided in the casings. The weights of each set which exceed the weight of the load may be lifted off and lowered onto their seats by hand- or motor-controlled means.

In a preferred embodiment of my invention a frame is provided which is adapted to engage the weights of a set, the weights being provided with lugs projecting from slots provided in the walls of the casing and adapted to be engaged by said frame. Each set is so designed as to permit the beam or beams to oscillate freely after each weight lifting operation. The frame for lifting the weights is operated by a lever on a shaft, this being the approved construction in weighing machines, as it facilitates the connection of the operating devices with auxiliary mechanism such as indicators, ticket printing apparatus and the like.

All the weights of a set are perfectly identical and are suspended and handled in a substantially closed casing so that the weights cannot leave the casing and interference of the weights of one set with those of another set is effectively prevented.

With a casing provided for each set of weights it is possible to ship the weighing machine without fear of the weights jamming and the arrangement of the weights in their casings is absolutely fool-proof.

The reduced depth and the suspension of the casings on two knife edges provides a more favorable distribution of weights. The oscillations of the sets are reduced in proportion to the reduced depth, without, however, interfering with the free play of each set on its edges.

The weight-handling frames are guided in uprights which are preferably pressed from sheet metal and are so shaped as not only to guide the frame, but also to protect the weights from damage and tampering.

In the drawings affixed to this specification and forming part thereof, a device embodying my invention is illustrated diagrammatically by way of example.

In the drawings—

Fig. 1 is a perspective view of the beams of a weighing machine and a set of weights in position thereon, only one set being shown for the sake of convenience.

Fig. 2 is an elevation of a set of weights, partly drawn in section,

Fig. 3 is a front elevation and

Fig. 4 is a plan view.

Referring to the drawings, 1, 1 are two beams suspended in bearings 2', 2' on a shaft 2 provided with knife edges. The load is applied to a bar 3 at the ends of the beams. The several sets of weights are suspended in casings 16, only one of which is illustrated. Each casing is suspended from the beams 1, 1 by means of knife edges 4, 4' engaging seats formed in lugs of the casing.

The weights 7, 8, 9, 10, 11, 12, 13, 14, 15 of a set are identical in shape and weight and are suspended on lugs $7^a$, $8^a$ . . . which project from slots $7^b$, $8^b$ . . . in the transverse walls of the casing. The lugs have knife edges which are adapted to engage V-shaped seats at the ends of the slots so that the weights are led to assume a vertical position in the casing. The weights are arranged symmetrically with regard to the central plane of the casing 16 but staggered in their vertical positions so that the lifting frame 17 will alternately lift weights on the right and the left of the central plane so that the distribution of the weights remains uniform.

The transverse plates of the lifting frame 17 are provided with notches 19 adapted to engage the edges of the lugs $7^a$, $8^a$ . . . of the weights. The frame 17, which may also be tubular or U-shaped, is operated by a hand lever 18 on a shaft 18' which can be secured in position by means of a segment $18^2$ and a pawl $18^3$ in its handle $18^4$. Two levers 21 and 22 are secured on the shaft 18' at a distance equal to the width of the lifting frame 17 and adapted to engage pins 23 and 24 on said frame by slotted eyes. Pins 25 and 26 are secured in the frame vertically above the lifting pins 23, 24, these pins serving for guiding the frame in vertical grooves 27 and 28 of vertical uprights 20. This provides for a correct guiding of the frame and for uniform and reliable handling of the weights.

For the sake of clearness the uprights 20 are drawn narrower than the casing 18, but in reality they are as wide as or wider than the frame 17 in order to protect the weights.

I wish it to be understood that I do not desire to be limited to the exact details of construction shown and described, for obvious modifications will occur to a person skilled in the art.

I claim:—

1. Counterbalance weighing machine comprising a beam, a casing suspended from one arm of said beam and having seats formed therein at different levels and a set of weights normally seated side by side on said seats.

2. Counterbalance weighing machine comprising a beam, a casing suspended from one arm of said beam and having seats formed therein at different levels, a set of weights normally seated side by side on said seats and hand-controlled means for lifting the weights in excess of the load off their seats.

3. Counterbalance weighing machine comprising a beam, a casing suspended from said beam, a set of weights normally suspended in said casing, lugs on said weights adapted to support said weights in said casing and to project from said casing when the weights are so suspended, a frame surrounding said casing and adapted to engage said projecting lugs and means for raising said frame.

4. Counterbalance weighing machine comprising a beam, a casing suspended from one end of said beam, a set of weights normally suspended from seats provided in said casing, means for lifting said weights off their seats, and sheet metal uprights having guides for said lifting means.

In testimony whereof I affix my signature.

Dr. WILLY PÜLZ.